(12) United States Patent
Hinz et al.

(10) Patent No.: US 6,806,348 B2
(45) Date of Patent: Oct. 19, 2004

(54) PROCESS FOR REMOVING AND REGENERATING A DOUBLE METAL CYANIDE (DMC) CATALYST FROM A POLYMER POLYOL

(75) Inventors: Werner Hinz, Grosse Ile, MI (US); Edward Michael Dexheimer, Grosse Ile, MI (US)

(73) Assignee: BASF Corporation, Mt. Olive, NJ (US)

( * ) Notice: Subject to any disclaimer, the term of this patent is extended or adjusted under 35 U.S.C. 154(b) by 0 days.

(21) Appl. No.: 10/364,788

(22) Filed: Feb. 11, 2003

(65) Prior Publication Data

US 2004/0158032 A1 Aug. 12, 2004

(51) Int. Cl.$^7$ .................................................. C08G 6/00
(52) U.S. Cl. ........................ 528/480; 502/175; 502/200; 521/123; 521/134; 521/155; 521/174; 524/500; 524/762; 528/481; 568/620; 568/679
(58) Field of Search ................................. 502/175, 200; 521/123, 174, 134, 155; 524/500, 762; 568/620, 679; 528/480, 481

(56) References Cited

U.S. PATENT DOCUMENTS

| | | | |
|---|---|---|---|
| 4,355,188 A | 10/1982 | Herod et al. | 568/620 |
| 4,472,560 A | 9/1984 | Kuyper et al. | 526/120 |
| 4,500,704 A | 2/1985 | Kruper et al. | 528/405 |
| 4,721,818 A | 1/1988 | Harper et al. | 568/120 |
| 4,826,887 A | 5/1989 | Kuyper et al. | 521/189 |
| 4,826,952 A | 5/1989 | Kuyper et al. | 528/405 |
| 4,826,953 A | 5/1989 | Kuyper et al. | 528/405 |
| 4,877,906 A | 10/1989 | Harper | 568/621 |
| 4,987,271 A | 1/1991 | Watabe et al. | 568/621 |
| 5,099,075 A | 3/1992 | Katz et al. | 568/621 |
| 5,144,093 A | 9/1992 | Reisch et al. | 568/621 |
| 5,158,922 A | 10/1992 | Hinney et al. | 502/175 |
| 5,235,114 A | 8/1993 | Reisch et al. | 568/621 |
| 5,482,908 A | 1/1996 | Le-Khac | 502/156 |
| 5,525,565 A | 6/1996 | Le-Khac | 502/159 |
| 5,714,428 A | 2/1998 | Le-Khac | 502/159 |
| 5,958,994 A | 9/1999 | Lear et al. | 521/174 |
| 6,013,731 A | 1/2000 | Holeschovsky et al. | 525/123 |
| 6,083,420 A | 7/2000 | Lear et al. | 252/812.24 |
| 6,143,802 A * | 11/2000 | Simroth et al. | 521/123 |
| 6,204,357 B1 | 3/2001 | Ooms et al. | 528/409 |
| 6,362,126 B1 | 3/2002 | Grosch et al. | 502/154 |
| 6,410,676 B1 | 6/2002 | Yamasaki et al. | 528/76 |
| 6,429,342 B1 | 8/2002 | Clement et al. | 568/616 |
| 6,608,231 B1 * | 8/2003 | Ooms et al. | 568/613 |
| 2003/0032761 A1 | 2/2003 | Hofmann et al. | 528/198 |

FOREIGN PATENT DOCUMENTS

| | | |
|---|---|---|
| EP | 0903364 | 12/1994 |
| EP | 0385619 | 5/1997 |
| WO | WO 9516724 | 6/1995 |
| WO | WO 9729146 | 2/1997 |
| WO | WO 9852689 | 4/1998 |

* cited by examiner

*Primary Examiner*—Terressa Boykin
(74) *Attorney, Agent, or Firm*—Fernando A. Borrego; Howard & Howard Attys.

(57) ABSTRACT

A method of removing and reclaiming a double metal cyanide (DMC) catalyst from a polyol is disclosed. A polymeric acid that is soluble in the polyol is introduced into the polyol during or after the polymerization reaction. The polymeric acid reacts with the double metal cyanide catalyst thereby causing the double metal cyanide catalyst and the polymeric acid to form an agglomeration in the polyol. The agglomeration is easily separated from the polyol via filtration, for example. The recovered agglomerated DMC catalyst can then be reconstituted using an acid solution.

40 Claims, No Drawings

PROCESS FOR REMOVING AND REGENERATING A DOUBLE METAL CYANIDE (DMC) CATALYST FROM A POLYMER POLYOL

FIELD OF THE INVENTION

The present invention relates to the removal and reclamation of a double metal cyanide catalyst from a polyol formed using the double metal cyanide catalyst.

BACKGROUND OF THE INVENTION

Preparation of polyether polyols using double metal cyanide (DMC) catalysts is well known. Typically, the DMC catalyst is used in an amount of from 20 ppm to 40 ppm of the polyol product to catalyze the polyol chain formation. When using DMC catalyst at these low levels, however, the reaction parameters must be strictly controlled in order to avoid catalyst deactivation by catalyst poisons introduced into the reaction mixture even in minute amounts, which is difficult in a mass production environment. Further, given the low concentration of the DMC catalyst, the DMC catalyst must also be monitored closely. It is believed that the reaction parameters and process conditions must be maintained in extremely tight ranges when DMC catalyst concentrations are below 100 ppm. Alternatively, it has proven to be desirable to introduce levels of the DMC catalyst to the polyol formation reaction of from 100 ppm to 500 ppm, or higher. At these higher levels of DMC catalyst, however, it is cost prohibitive to not reclaim the DMC catalyst from the resultant polyol. Further, when high levels of DMC catalyst are still present in a polyol when it is used in the formation of polyurethane polymers, the properties desirable in the polyurethane polymer produced can be adversely affected.

When forming a polyethercarbonate polyol from the reaction of an initiator with alkylene oxide monomer and carbon dioxide monomer even higher levels of DMC catalyst, preferably in the range of 100–500 ppm, are required. Because these high levels of DMC catalyst are required, it is imperative to remove the DMC catalyst from the polyethercarbonate polyol prior to its use for the formation of polyurethane polymer. In addition, the DMC catalyst must be recovered from a cost standpoint.

Further, ethylene oxide-capped polyols are difficult to prepare using only a DMC catalyst. Therefore, it is necessary to introduce a second catalyst, such as, for example, KOH, prior to the ethylene oxide addition step after removing or deactivating the DMC catalyst. Therefore, it is desirable to develop a method to rapidly remove the DMC catalyst after the main, DMC catalysed polyol formation reaction step.

U.S. Pat. No. 5,627,120 discloses the preparation of highly active DMC catalysts, which allows the use of the DMC catalysts in low concentrations, eliminating the need for catalyst removal. However, the use of DMC catalysts in very low concentrations leads to the problem of DMC catalyst deactivation by catalyst poisons, which are present in initiators and monomers in minute quantities. It also does not provide a solution to the problem of the production of PO-EO block copolymer polyols, in which case the DMC catalyst has to be removed quantitatively after the PO block is complete.

Various attempts have been made to remove the DMC catalyst from the liquid polyol product in the past. A common form of removal is through cake filtration. One such method is disclosed in U.S. Pat. No. 4,721,818, which teaches reacting the crude polyol with an alkali metal hydride to convert the DMC catalyst into an insoluble species, which can then be removed by filtration. Because, the DMC catalyst particles disposed in the polyol are so fine, an additional filter aid, like diatomaceous earth is usually necessary to form the filter cake upon a filtration media prior to the effective removal of the DMC catalyst from the polyol product. The DMC catalyst cannot be recovered from the filter cake and the filtration process is very time consuming. Additionally, some of the DMC catalyst can remain attached to the polyol polymer chains and therefore, become trapped in the polyol and cannot be removed through filtration.

U.S. Pat. No. 5,416,241 discloses removing the DMC catalyst by treating the DMC containing polyol with alkali metal compounds followed by the addition of magnesium silicate adsorbent and filtration. Again this removal process is designed to convert the DMC catalyst into a filterable form, it is destructive, and the DMC catalyst residue becomes trapped in the resulting filter cake.

U.S. Pat. No. 5,099,075 discloses removing the DMC catalyst by treating the DMC containing polyol with oxidants followed by removal of the residues by filtration, extraction or centrifugation. Again this removal process is designed to convert the DMC catalyst into a filterable form and the active DMC catalyst is destroyed.

DE 1 980 9539 discloses the preparation and use of DMC catalysts on an inert support. The supported DMC catalyst can readily removed by filtration or is retained in the reactor as part of a continuous production process. The problem here is the potential lack of stability of the DMC catalyst—support which results in release of the DMC catalyst into the process mixture, contamination of the polyol product with DMC catalyst and loss of catalyst activity.

U.S. Pat. No. 5,248,833 discloses contacting the DMC catalyst containing polyol product with aliphatic alcohols and a chelating agent and removing the insoluble complex formed. The required use of a dilution solvent in combination with the described chelating agents and the required removal of the solvent after removal of the DMC catalyst establishes a complex and expensive process.

Various attempts have been made to separate the DMC catalyst and reuse the separated DMC catalyst.

European Patent EP 385 619 discloses the addition of non-polar solvents to achieve the separation of the DMC catalyst particles form the polyol product. A filter aid is added and the DMC catalyst removed by filtration. The DMC catalyst collected using this procedure may be contained in large amounts of filter aid and no attempts are being made to restore the DMC catalysts original activity.

DE 1 995 7105 discloses separating the DMC catalyst from the polyol product by sedimentation and centrigugation. The addition of large amounts of filter aids is avoided and the DMC catalyst is reused. The separation of the very fine DMC particles by purely mechanical means is technically very difficult, time consuming and costly, however, and the process is not economical.

Although these patents disclose various methods for separating the DMC catalyst from the polyol, they do not disclose a method for solving the problem of recovering an active DMC catalyst from the polyol for reclamation. Each of the prior art methods of separating the DMC catalyst from the polyol set forth above are either destructive to the DMC catalyst or introduce processing steps that render reclamation of the DMC catalyst uneconomical. Therefore, it would be desirable to provide a simple method of removing the DMC catalyst from a polyol while simultaneously solving the problem of recovering the DMC catalyst in an active form and regenerating the DMC catalyst to its original activity by a simple and cost effective process.

SUMMARY OF THE INVENTION

The present invention discloses a method of removing and reclaiming a double metal cyanide catalyst used during the formation of a polyol. A reagent that is soluble in the polyol medium is introduced into the liquid polyol product. The reagent is preferably a polymeric acid that is soluble in the liquid polyol. The reagent reacts with the DMC catalyst causing the DMC catalyst and the reagent to form an agglomeration that is insoluble in the liquid polyol product. Further, the reagent extracts DMC catalyst from reaction sites on the polyol chain through protonation of the polymer polyol chain ends to form the agglomeration. The agglomeration forms DMC catalyst particles agglomerates of a large enough size to provide the ability to remove the DMC catalyst from the polyol product by filtration without any filter aids using a standard filter media. In addition the reagent can be separated from the DMC catalyst and the original active DMC catalyst can be regenerated by simple treatment with the original acid contained in the original DMC catalyst.

Through the introduction of a reagent that is capable of reacting with the free DMC catalyst and capable of separating the DMC catalyst remaining attached to the polyol reactive sites, the problems not addressed by the prior art patents set forth above are solved. The inventive reagent forms an agglomeration with the DMC catalyst that increases the effective particle size of the DMC catalyst allowing the DMC catalyst to be easily filtered from the polyol by conventional methods. Accordingly, a conventional filter such as an indexing paper filter may be used to filter the DMC catalyst from the polyol product without having to first form a filter cake of the DMC catalyst. Once the DMC catalyst has been separated from the polyol, the DMC catalyst can be easily reclaimed from the polymeric acid. To be able to efficiently and effectively remove the DMC catalyst from the polyol product and to regenerate the original DMC catalyst allows higher concentrations of the DMC catalyst to be used in the polyol production process. This allows the use of lower quality, less expensive DMC catalyst and reduces the risk of DMC catalyst deactivation by DMC catalyst poisons introduced into the reaction mixture.

DETAILED DESCRIPTION OF A PREFERRED EMBODIMENT OF THE INVENTION

Double metal cyanide (DMC) catalysts are widely used in the formation of polyols. Polyols are reacted with isocyanates to form urethane products such as foams and elastomers. As is known to those of skilled in the art, polyether polyols are formed by reacting alkylene oxides with at least one initiator in the presence of a catalyst to form the desired polyol through a polymerization reaction.

Alkylene oxides typically used include ethylene oxide, propylene oxide, and butylene oxide. To form a polyether carbonate polyol, the polymerization reaction takes place in the presence of carbon dioxide, which is incorporated into the polyol structure. Initiator molecules suitable for the present invention include all initiators having at least one alkylene oxide reactive hydrogen such as alcohols, polyhydric alcohols and amine compounds. Examples of alcohols include aliphatic and aromatic alcohols, such as lauryl alcohol, nonylphenol, octyphenol, and $C_{12}$ to $C_{18}$ fatty alcohols. Examples of the polyhydric alcohols include diols, triols, and higher functional alcohols such as sucrose, and sorbitol. Amine compounds include the diamines such as ethylene diamine, toluene diamine, and other polyamines. In a preferred embodiment, these initiator compounds are utilized to form oligomers having number average molecular weights of from about 200 to 1500. These oligomers are formed utilizing either self-catalyzing initiators or using base catalysts to add a plurality of alkylene oxides to the initiator molecule. The oligomer molecules can then be utilized with the DMC catalysts of the present invention to form the desired polyol.

Double metal cyanide catalysts are used to increase and control the rate of the polymerization reaction. Double metal cyanide catalysts known to be effective include: zinc hexacyanoferrate (III), zinc hexacyanoferrate (II), nickel (II) hexacyanoferrate (II), nickel (II) hexacyanoferrate (III), zinc hexacyanoferrate (III) hydrate, cobalt (II) hexacyanoferrate (II), nickel (II) hexacyanoferrate (III) hydrate, ferrous hexacyanoferrate (III), cobalt (II) hexacyano cobaltate (III), zinc hexacyano cobaltate (II), zinc hexacyanomanganate (II), zinc hexacyano chromate (III), zinc iodo pentacyanoferrate (III), cobalt (II) chloropentacyanoferrate (II), cobalt (II) bromopentacyanoferrate (II), iron (II) fluoropentacyanoferrate (III), zinc chlorobromotetracyanoferrate (III), iron (III) hexacyanoferrate (III), aluminum dichlorotetracyanoferrate (III), molybdenum (IV) bromopentacyanoferrate (III), molybdenum (VI) chloropentacyanoferrate (II), vanadium (IV) hexacyanochromate (III), vanadium (V) hexacyanoferrate (III), strontium (II) hexacyanomanganate (III), tungsten (IV) hexacyano vanadate (IV), aluminum chloropentacyano vanadate (V), tungsten (VI) hexacyanoferrate (III), manganese (II) hexacyanoferrate (II), chromium (III) hexacyanoferrate (III), and so forth. Still other cyanide complexes can also be used such as $Zn[Fe(CN)_5NO]$, $Zn_3[Fe(CN)_5NO_2]_2$, $Zn[Fe(CN)_5CO]$, $Zn[Fe(CN)_5H_2O]$, $Fe[Fe(CN)_5OH]$, $Cr[Fe(CN)_5NCO]$, $Cr[Fe(CN)_5NCS]$, $Al[Co(CN)_5CNO]$, $Ni_3[Mn(CN)_5CNS]_2$, and the like. Mixtures of these compounds can be employed. Each of these double metal cyanide catalysts and processes for making same are disclosed in U.S. Pat. Nos. 4,472,560; 4,500,704; 4,826,887; 4,826,952; and 4,826,953, the disclosures of which are herein incorporated by reference.

Different polyols may require different concentrations of the DMC catalyst to form polyols having the desired molecular weight. For the formation of polyethercarbonate polyols, for example, much higher levels of DMC catalyst are needed than for the formation of corresponding polyether polyols. The DMC catalyst not attached to the polymers at these high DMC catalyst levels remains clearly visible making the polyol take on a milky appearance. Therefore, at high catalyst concentrations the DMC catalyst must be removed from the polyol product. Due to the high cost of the DMC catalyst, it would also be desireable and economically advantageous to reclaim a significant percentage of DMC catalyst particles and reuse the DMC catalyst in subsequent polyol production. As discussed, for polyether carbonate polyols, higher levels of DMC catalysts are introduced into the polymerization reaction to produce a polyol having a desirable molecular weight. Specifically, it is desirable to introduce concentrations of from 100 to 500 parts per million of DMC catalyst to the polymerization reaction. An inability to reclaim the DMC catalyst from the resultant polyol at these concentrations can both significantly increase the cost of the polyol and also adversely affect the desired properties of the polyol.

It has been discovered that through the introduction of a reagent to the polymerization reaction the DMC catalyst can be agglomerated by the reagent to form an agglomeration that is easily filtered from the polyol. Preferably, a polymeric acid that is soluble in the polyol is introduced into the liquid polyol as the reagent to form the agglomeration with the DMC catalyst. While not wishing to be bound by the theory, it is believed that an acid group in the polymeric acid protonates the end group in polyether polyols or polyether-carbonate polyols at the reactive site where the DMC catalyst is attached. Through the protonation of the reactive chain ends the polyols leave the DMC catalyst, and the DMC catalyst is bonded by the polymeric acid and removed from the now-protonated reactive sites. It is assumed that the bonding is at the active metal sites of the DMC catalyst. Preferably, the polymeric acid includes at least two reactive groups capable of protonating the polyol and reacting with one or more DMC catalyst particles. More preferably, the polymeric acid includes a plurality of reactive groups that can react with a significant number of DMC catalyst particles to form a large agglomeration that can be easily removed from the polyolcomponent.

Suitable polymeric acids known to provide a desirable reactivity with the DMC catalyst include polycarboxylic acids, polysulfonic acids, polyacrylic acid and mixtures thereof. Preferably, the polymeric acid has a molecular weight of from 500 to 10,000. Within this size range, the polymeric acids have proven to be effective at adsorbing the DMC catalysts from the polyol component. Preferably, the polymeric acid is present in a molar ratio of from 0.01:1 to 100:1 relative to the DMC catalyst, and more preferably in a molar ratio of from 0.1:1 to 10:1.

Alternate methods of bonding the polymeric acid to the DMC catalyst can be used. If a polymeric acid having a high bonding strength with the DMC catalyst is selected, a desirable molar ratio between the polymeric acid and the DMC catalyst can be used to achieve protonation. Alternatively, a mass action method of bonding the polymeric acid to the DMC catalyst may also be used where a molar excess of polymeric acid relative to the DMC catalyst is added to the polyol component. In this case, the polymeric acid does not need to have a high bonding strength with the DMC catalyst.

The agglomeration formed by the DMC catalyst and the reagent are easily filtered from the polyol using standard filter media due to its size. Further, because the DMC catalyst has been removed from the polyol in large quantities, the DMC catalyst can now be reclaimed for further use. To separate the DMC catalyst from the polymeric acid, the agglomeration is treated with the acid the anion of which is intended to be included in the DMC catalyst as the DMC catalyst is reconstitued in the process. Typically this is hydrochloric acid or acetic acid. For example, acetic acid has proven effective to reclaim an active DMC catalyst when a weak polymeric acid is used. The freed polymeric acid is now easily removed from the DMC catalyst by filtration and repeated washing. The DMC catalyst now has been reconstituted in its original active form containing acetate anions. For other polymeric acids the wash and reclamation may require hydrochloric acid. This provides for regenerated DMC cataysts bearing chloride counter ions. The DMC catalyst can then be further washed with water. Therefore, it is preferable to provide a polymeric acid that is soluble in water as well as in the polyolcomponent. The washed DMC catalyst can then be recrystalized as is known to those of skilled in the art.

The use of polymeric acids as reagents in the DMC catalyst agglomeration and filtration process allows the ready removal of the DMC catalyst from the polyol product and the reconstitution of the original active DMC catalyst. In one particular aspect of the invention, also polyamine compounds such as polyethyleneimines can be used to affect the agglomeration of DMC particles. The DMC—polyamine agglomerates do not lend themselves to facile regeneration of the original DMC catalyst by the simple addition of the desired acid, and the use of polyacids is thus preferred.

Examples of DMC catalyst removal will now be given.

EXAMPLES

General Procedure for Large Scale Polyethylene Alcohol Polyol Preparation

Example 1

A clean and dry two-gallon autoclave, equipped with an agitator, external heating, internal cooling via a cooling coil, propylene oxide feed line, gas feed line, temperature sensor and pressure sensor, was charged with a purified initiator polyol, an adduct of glycerin and propylene oxide monomer, MW 730, water content less than 0.03%, residual catalyst content less than 5 ppm, and a DMC catalyst. The initiator-catalyst mixture is heated to 130° C. under a vacuum of less than 1 mm Hg for two hours to remove any residual moisture. The vacuum system is disconnected and the reactor pressurized to 0 psi using argon gas. 200 grams of propylene oxide is added and the pressure increase in the reactor is monitored. Within 15 to 30 minutes, the reactor pressure decreases to 0 psi, indicating that the DMC catalyst is active. 1800 grams of propylene oxide monomer is then added at 130° C. at a substantially constant rate over a three-hour period. Following the completion of the propylene oxide addition step, unreacted propylene oxide is left to react out at 130° C. The reactor is then vented and cooled and the product is collected. The peak molecular weight and the weight average molecular weight are determined by gel permeation chromatography. The viscosity is measured using a Brookfield DV-III rheometer at 25° C.

Following the two-gallon autoclave procedure, 1000 g of the purified initiator polyol, 20 g of a suspension of DMC catalyst (5% in a purified initiator polyol, an adduct of glycerin and propylene oxide monomer, MW 730=0.025 g catalyst) is used. The reaction temperature is 130° C. The yield of the reaction product obtained is 2835 g. The peak molecular weight is 1874. The weight average molecular weight is 2066. The polydispersity Mw/Mn is 1.05. The viscosity of the product is 499 cP.

Example 2

A clean, dry five-gallon autoclave, equipped with an agitator, external heating, internal cooling via a cooling coil, propylene oxide feed line, gas feed line, temperature sensor, and pressure sensor, is charged with 5907 g of a purified initiator polyol, an adduct of glycerin and propylene oxide monomer, MW 430, water content less than 0.03%, residual catalyst content less than 5 ppm. Then, 168 g of a 5% suspension of the DMC catalyst and an adduct of glycerin and propylene oxide monomer, MW 900, is also added. The initiator-catalyst mixture is heated to 120° C. under a vacuum of less than 10 mm Hg for one hour to remove any residual moisture. The vacuum system is disconnected and a reactor pressurized to 0–2 psi using nitrogen gas. 400 g of propylene oxide is added over 15 minutes and the pressure increase in the reactor is monitored. Within 15–30 minutes, the reactor pressure declined back to 0 psi indicating that the DMC catalyst is active. 7533 g of propylene oxide is then added at 120° C. at a constant rate of 2000 g/hour.

Following the completion of the propylene oxide addition step, unreacted propylene oxide is left to react out to a constant pressure at 120° C. The reactor is then vented and evacuated to less than 10 mm Hg for one hour. The vacuum is relieved with $N_2$ gas. After cooling, the product is collected. The peak molecular weight and the weight average molecular weight were determined by gel permeation chromatography. The peak molecular weight is 840. The weight average molecular weight is 935. The polydispersity Mw/Mn is 1.06. The hydroxyl number is 171.6. The acid number is 0.006. For catalyst removal experiments, the product thus obtained is mixed with a glycerin-propylene oxide adduct having a molecular weight of 730 (ratio 2:3 w/w). The concentration of the DMC catalyst in the resulting mixture is determined by atomic absorption spectroscopy indicating a zinc concentration of 53 ppm and a carbon monoxide concentration of 24 ppm.

Synthesis of Polyethylene Carbonate Polyols

General Procedure for Polyethylene Carbonate Polyol Preparation

Example 3

A clean, dry two-gallon autoclave equipped with an agitator, external heating, internal cooling via a cooling coil, propylene oxide feed line, gas feed line, temperature sensor, and pressure sensor is charged with a purified initiator polyol, an adduct of glycerin and propylene oxide monomer, MW 730, water content less than 0.03%, residual catalyst content less than 5 ppm and the DMC catalyst. The initiator-catalyst mixture is heated to 130° C. under a vacuum of less than 1 mm Hg for two hours to remove any residual moisture. The vacuum system is disconnected and the reactor pressurized to 0 psi using argon gas. 200 g of propylene oxide is added and the pressure increase in the reactor is monitored. Within 15–30 minutes, the reactor pressure declined back to 0 psi indicating that the DMC catalyst is active. 2500 g of propylene oxide monomer is then added at 130° C. at a constant rate over a three-hour period. Ten minutes after commencement of the propylene oxide feed, the reactor is pressurized with $CO_2$ gas for the duration of the propylene oxide feed and the propylene oxide reaction. Following the completion of the propylene oxide addition step, unreacted propylene oxide is left to react out at 130° C. The reactor is then vented and cooled and the product collected. The peak molecular weight and the weight average molecular weight were determined by gel permeation chromatography. The viscosity is measured using a Brookfield DV-III rheometer. The carbonate content of the polymer is determined by infrared spectroscopy and calculated as weight percent $CO_3$ in the polymer.

Following the two-gallon autoclave procedure, 100 g of the purified initiator polyol, 20 g of a suspension of the DMC catalyst (5% in a purified initiator polyol, an adduct of glycerin and propylene oxide monomer, MW 730=0.025 g catalyst) were used. The reaction temperature is 130° C. The reactor is pressurized with $CO_2$ through the slow addition of 608 g of $CO_2$. The yield of the reaction product obtained is 3859 g. The peak molecular weight is 2111. The weight average molecular weight is 2990. The polydispersity Mw/Mn is 1.26. The viscosity of the crude product is 1230 cP. The viscosity of the product after propylene carbonate removal is 1500 cP. The carbonate content of the polyethylene carbonate polyol is 5.8%.

DMC Catalyst Removal from Polyethylene Alcohol and Polyethylene Carbonate Polyols General Procedure for the Removal of Residual Catalyst The crude polyol is placed in a five liter, four neck glass equipped with an overhead stirrer, a heating mantle, a temperature controller, and an $N_2$ bleed tubing connection to a pump, and a cartridge filter apparatus. The filtered product is collected in a second five liter flask for post-filtration removal of all volatiles.

The crude polyol is heated to 90° C. When applicable, the filter agent is added and stirred for one hour. Subsequent to stirring, 3% magnesium-aluminum adsorbent (Magnesol®) and 1% water were added. The resulting suspension is stirred at 90° C. for one hour. The suspension is then pumped through the attached cartridge filter and then purified polyol is collected. Any volatiles were then removed at 110° C. under reduced pressure of less than 5 mm Hg. Residual DMC catalyst concentration is determined by Zn and CO analysis using atomic absorption spectroscopy.

Removal Example 1

Following the general procedure described above, the crude polyethylene alcohol polyol prepared in Example 1 is purified using Magnesol® adsorbent (3% ww) and water (1%). The DMC catalyst concentration in the crude polyol as determined by Zn/CO analysis is Zn: 76 ppm, CO 33 ppm. The residual DMC catalyst concentration after purification is Zn 42 ppm, CO 19 ppm. The results indicate the DMC catalyst can be partially removed from the polyethylene alcohol polyol using a filter aid alone.

Removal Example 2

Following the general procedure described above, the crude polyethylene carbonate polyol prepared in Example 3 is purified using Perlite® (3%) and water (1%). The DMC catalyst concentration in the crude polyol as determined by Zn/CO analysis is Zn: 61 ppm, CO 27 ppm. The residual DMC catalyst concentration after the Perlitet purification step is Zn: 39 ppm, CO 17 ppm. The results indicate that the DMC catalyst can be partially removed from the polyethylene carbonate polyol using a filter aid.

Removal Example 3

Following the general procedure described above, 2000 g of crude polyethylene alcohol polyol prepared in Example 2 is purified using 20 g Magnesol® adsorbent (1%) and 10 g water (0.5%). The DMC catalyst concentration in the crude polyol as determined by Zn/CO analysis is Zn: 53 ppm, CO: 24 ppm. The residual DMC catalyst concentration after purification is Zn: 14 ppm, CO 6 ppm. The results indicated that the DMC catalyst removal from the polyethylene alcohol polyol using Magnesol® adsorbent only partially reduced the DMC concentration.

Removal Example 4

Following the general procedure described above, 2000 g of crude polyethylene alcohol polyol prepared in Example 2 is purified using 20 g of Hyflo® filter aid (1%) and 10 g water (0.5%). The DMC catalyst concentration in the crude polyol as determined by Zn/CO analysis is Zn: 52 ppm, CO: 24 ppm. The residual DMC catalyst concentration after purification is Zn: 14 ppm, CO 6 ppm. The results show DMC catalyst removal from polyethylene carbonate polyol using the Hyflo® filter aid partially reduced the DMC concentration in the polyol.

Removal Example 5

Following the general procedure described above, 2000 g of crude polyethylene alcohol polyol prepared in Example 2 is purified using 1 g glutaric acid, 20 g Magnesol® adsorbent (1%), and 10 g water (0.5%). The DMC catalyst concentration in the crude polyol as determined by Zn/CO analysis is Zn: 53 ppm, CO 24 ppm. The residual DMC catalyst concentration after purification is Zn: 9 ppm, CO: <6 ppm. The results show that the DMC catalyst removal from the polyethylene alcohol polyol using a monomeric polyfunctional acid in addition to Magnesol® and water further reduced the DMC concentration compared to Removal Example 3.

Removal Example 6

Following the general procedure described above, 2000 g of crude polyethylene alcohol polyol prepared in Example 2 is purified using 10 g of polyacrylic acid (powder, MW 2,000,000), 20 g Magnesol® adsorbent (1%), and 10 g water (0.5%). This high molecular weight polyacrylic acid is not very soluble in the polyol. The DMC catalyst concentration in the crude polyol as determined by Zn/CO analysis is Zn: 53 ppm, CO: 24 ppm. The residual DMC catalyst concentration after purification is Zn: 26 ppm, CO: 11 ppm. The results indicate that the DMC catalyst removal using high molecular weight polymeric acid, that is insoluble in product polyol, reduced the DMC catalyst concentration less than the Magnesol® alone in Removal Example 3.

Removal Example 7

Following the general procedures described above, 2000 g of crude polyethylene alcohol polyol prepared in Example 2 is purified using 10 g polyacrylic acid (MW 5000, 50% solution in water, 5 g equal 2500 PPM=1 mmole), 20 g Magnesol® adsorbent (1%) and 10 g water (0.5%). The DMC catalyst concentration in the crude polyol as determined by Zn/CO analysis is Zn: 53 ppm, CO: 24 ppm. The residual DMC catalyst concentration after purification is Zn: <2 ppm (less than detection limit), CO: 0 ppm (less than detection limit). The results indicate quantitative DMC catalyst removal by a soluble polymeric acid compound. DMC Catalyst Recycling

Recycling Example 1

950 mg DMC catalyst 1362, 1 mmole of Zn acetate DMC, is suspended in 2000 ml water at 40°–50° C. 20 g polyacrylic acid (MW 5000, 50% in water (2 mmole) is added to the suspension and stirred at 40°–50° C. for two hours. Solids were collected by filtration through filter paper, flushed three times with water and dried in an oven overnight at 65° C. The IR spectrum of the solid is identical to the original DMC catalyst 1362. The results show that the polyacrylic acid did not displace the AcOH residues from the DMC catalyst surface.

Recycling Example 2

1.5 g of DMC suspension (5%, 75 mg catalyst, 0.075 mmole) is suspended in 105 g of a glycerine-propylene oxide adduct (MW 730), and 1 g polyacrylic acid (MW 5000, 50% in water, 0.1 mmole) is added. The suspension is placed on a rotary evaporator for four hours at a temperature of 60°–80° C. to remove water. The resulting suspension is placed under vacuum overnight and used as a catalyst suspension in the following process.

A clean and dry 300 ml autoclave, equipped with an agitator, an external heating unit, internal cooling via cooling coil, propylene oxide feed line, gas feed line, temperature sensor, and pressure sensor, is charged with 70 g of the catalyst suspension prepared above. The initiator-catalyst mixture is heated to 110° C. under a vacuum of less than 1 mm Hg for three hours to remove any residual moisture. The vacuum system is disconnected and the reactor pressurized to 0 psi using Argon gas. Then, 5 g of propylene oxide is added and the pressure increase in the reactor is monitored. Within 15–30 minutes, the reactor pressure declined back to 0 psi, indicating that the DMC catalyst is active. Then, 170 g of propylene oxide is added at 110° C. at a constant rate of 1 g/min. Following the completion of the propylene oxide addition step, unreacted propylene oxide is left to react out at 110° C. The reactor is then vented and cooled and the product collected. The yield is 230 g. The peak molecular weight is 1475. The weight average molecular weight is 29,160 and the polydispersity is 12.8. All values were determined by gel permeation chromatography.

The results indicate that the presence of the polyacrylic acid negatively affected the DMC catalyst activity when present in the suspension. Therefore, it is undesirable to have polymeric acid present in the suspension at initiation.

Recycling Example 3

Treatment of Activated DMC Catalyst with Polyacrylic Acid and Regeneration of DMC Catalyst Using Acetic Acid Preparation of Activated DMC Catalyst Suspension A clean, dry 3000 ml autoclave, equipped with an agitator, external heating, internal cooling via a cooling coil, propylene oxide feed line, gas feed line, temperature sensor, and pressure sensor, is charged with 40 g of a DMC catalyst suspension (5%, 2 g DMC catalyst) and 60 g of a glycerine-propylene oxide adduct (MW 730). The initiator-catalyst mixture is heated to 130° C. under a vacuum of less than 1 mm Hg for one hour to remove any residual moisture. The vacuum system is disconnected and the reactor pressurized to 0 psi using Argon gas. 10 g of propylene oxide is added and the pressure increased in the reactor is monitored. Within 15-30 minutes, the reactor pressure declined back to 0 psi, indicating that the DMC catalyst is active. 100 g propylene oxide monomer is then added at 110° C. at a constant rate of 2 g/min. Following the completion of the propylene oxide addition step, unreacted propylene oxide is left to react out at 110° C. The reactor is then vented and cooled and the product collected. The peak molecular weight and weight average molecular weight were determined by gel permeation chromatography.

Recycling Example 4

Treatment of Activated DMC Catalyst With Polyacrylic Acid and Regeneration of DMC Catalyst Using Acetic Acid 100 g of the resulting suspension of activated DMC catalyst and polyethylene alcohol polyol containing 1 g of activated DMC catalyst at a level of 1 mmole is mixed with 20 g polyacrylic acid having a molecular weight of 5000, 50% in water, at level of 2 mmole, and placed in a rotary evaporator at a temperature of 50°–60° C. to remove excess water. Within 30 minutes, white, polymeric, rubbery material separated from the suspension. The DMC-polyacrylic acid polymer is separated from the polyethylene alcohol polyol phase by filtration. The polyol phase is clear, indicating that all DMC catalyst is captured in the DMC-polyacrylic acid polymer. The polymeric material is flushed with water: t-butanol, 1:1. The weight is 18.5 g, which included polyacrylic acid (10 g), DMC catalyst (1 g) and polyethylene alcohol polyol (7.5 g). 9.2 g of the DMC-polyacrylic acid polymer is placed in 150 ml water: t-butanol equal 2:1 and 10 ml of acetic acid (99%) is added. The mixture is stirred at ambient temperatures for two hours and then at 50° C. for two hours. The polymeric material dissolved slowly and a fine suspension is formed. The crystalline solid is collected by filtration, flushed three times with water: t-butanol equal 2:1, and dried at 65° C. overnight. The IR spectrum of the solid (0.28 g) showed the presence of the regenerated DMC catalyst with the cn stretch being the dominant peak at 2183 cm−1.

Recycling Example 5

Treatment of Activated DMC Catalyst with Polyacrylic Acid and Regeneration of DMC Catalyst Using Acetic Acid and Use of Regenerated DMC as a Catalyst 100 g of the suspension of activated DMC catalyst and polyethylene alcohol polyol described above containing 1 g of activated DMC catalyst at a concentration of 1 mmole is mixed with 2 g polyacrylic acid having a molecular weight of 5000, 50% in water, at a concentration of 0.2 mmole, and placed on a rotary evaporator at a temperature of 50°–60° C. to remove excess water. After three hours, a coarse crystalline suspension had formed. The DMC/polyacrylic acid crystals were separated from the polyethylene alcohol polyol phase by filtration through filter paper. The polyol phase is clear, indicating that all the DMC catalyst is captured in the DMC/polyacrylic acid crystals. The wet filter cake weighed 4.9 g, and contained polyacrylic acid (1 g), DMC catalyst (1 g) and polyethylene alcohol polyol (2.9 g).

3 g of the DMC/polyacrylic acid crystalline material is placed in 150 ml water: t-butanol, 2:1 and 5 ml of acetic acid (99%) is added. The mixture is stirred at ambient temperatures for two hours and then at 50° C. for one hour. A fine suspension is formed slowly. The crystalline solid is collected by filtration, flushed three times with water, and dried at a temperature of 65° C. overnight. The IR spectrum of the solid (077 g) showed the presence of the regenerated DMC catalyst with the cn stretch being the dominant peak at 2183 cm−1.

Use of a Regenerated DMC Compound as a Catalyst

A clean, dry 300 ml autoclave, equipped with an agitator, external heating, internal cooling via a cooling coil, propylene oxide feed line, gas feed line, temperature, and pressure sensor, is charged with 70 g of glycerine-propylene oxide adduct, MW 730, and 0.2 g of the regenerated DMC catalyst disclosed above. The initiator-catalyst mixture is heated to 130° C. under a vacuum of less than 1 mm Hg for two hours to remove any residual moisture. The vacuum system is disconnected and the reactor pressurized to 0 psi using argon gas. Then 5 g of propylene oxide is added and the pressure increase in the reactor is monitored. Within 15–30 minutes, the reactor pressure declined back to 0 psi, indicating that the DMC catalyst is active. Then, 170 g propylene oxide is then added at 110° C. at a constant rate of 1 g/min. Following the completion of the propylene oxide addition step, unreacted propylene oxide is left to react out at 110° C. The reactor is then vented and cooled and the product is collected. The yield is 236 g. The peak molecular weight is 2105. The weight average molecular weight is 2486 and the polydispersity is 1.13. Each value is determined by gel permeation chromatography.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

What is claimed is:

1. A method comprising the steps of:
   forming a polyol in the presence of a double metal cyanide catalyst;
   adding a soluble polymeric acid to said polyol;
   reacting said polymeric acid with said double metal cyanide catalyst to form an agglomeration; and
   removing said agglomeration from said polyol.

2. The method as set forth in claim 1, wherein said polymeric acid is selected from the group of polycarboxylic acid, polysulfonic acid, polyacrylic acid and mixtures thereof.

3. The method as set forth in claim 1, wherein said step of reacting said polymeric acid with said double metal cyanide catalyst is further defined by protonating said polyol thereby removing said double metal cyanide catalyst from said polyol.

4. The method as set forth in claim 1, wherein said polymeric acid has a molecular weight from about 500 to about 10,000.

5. The method as set forth in claim 1, wherein said polymeric acid has at least two reactive groups, each reactive group being capable of reacting with said double metal cyanide catalyst to form said agglomeration.

6. The method as set forth in claim 1, further comprising the step of reacting said agglomeration with an acid after the removing step, thereby separating said agglomeration into said polymeric acid and said double metal cyanide catalyst and regenerating the DMC catalyst in its original active form.

7. The method as set forth in claim 1, wherein said polymeric acid is added in an amount such that the molar ratio of said polymeric acid to said double metal cyanide catalyst ranges from 0.01:1 to 10:1.

8. The method as set forth in claim 1, wherein said polymeric acid is added in an amount such that the molar ratio of said polymeric acid to said double metal cyanide catalyst ranges from 0.1:1 to 1:1.

9. The method as set forth in claim 1, wherein said DMC containing polyol is treated with said polymeric acid to affect agglomeration for at least 1 hour.

10. The method as set forth in claim 1, wherein said DMC containing polyol is treated with said polymeric acid to affect agglomeration at a temperature of 90 C.–150 C.

11. The method as set forth in claim 1, wherein said step of removing said agglomeration from said polyol comprises at least one of: filtering said agglomeration from said polyol by centrifugation or by using indexing filters.

12. The method as set forth in claim 1, wherein said polymeric acid is soluble in water.

13. The method as set forth in claim 1, further comprising the step of adding one of acetic acid or hydrochloric acid to said agglomeration following the removing step, thereby separating said agglomeration into said double metal cyanide catalyst and said polymeric acid.

14. The method as set forth in claim 13, further including the step of collecting and reusing said double metal cyanide catalyst.

15. The method as set forth in claim 13, further including the step of collecting, washing with water, drying and reusing said double metal cyanide catalyst.

16. The method as set forth in claim 13, further including the step of collecting, purifying by recrystallization and reusing said double metal cyanide catalyst.

17. The method as set forth in claim 13, wherein said on of acetic acid or hydrochloric acid is added in an amount such that the molar ratio of the acetic acid or hydrochloric acid to double metal cyanide catalyst is from about 0.1:1 to 100:1.

18. The method as set forth in claim 13, wherein one of said acetic acid or hydrochloric acid is added in an amount such that the molar ratio of the acetic acid or hydrochloric acid to double metal cyanide catalyst is from about 1:1 to about 10:1.

19. The method as set forth in claim 1, wherein said polymeric acid is added to said polyol when said polyol has reached a desired molecular weight.

20. A method comprising the steps of:
forming a polyol in the presence of a double metal cyanide catalyst;
adding a soluble polymeric amine to said polyol;
reacting said polymeric amine with said double metal cyanide catalyst to form an agglomeration; and
removing said agglomeration from said polyol.

21. The method as set forth in claim 20, wherein said step of removing said agglomeration from said polyol comprises filtering said agglomeration from said polyol by using centrifugation or by using indexing filters.

22. A method comprising the steps of:
forming a polyol in the presence of a multi metal cyanide catalyst;
adding an adsorbent having at least two reactive sites capable of protonating the polyol;
protonating the polyol thereby separating the multi metal cyanide catalyst from said polyol;
forming an agglomeration of said multi metal cyanide catalyst and said adsorbent; and
separating said agglomeration from said polyol.

23. The method as set forth in claim 22, wherein said adsorbent is soluble in the polyol and in water.

24. The method as set forth in claim 22, wherein said adsorbent is a polymeric acid.

25. The method as set forth in claim 24, wherein said polymeric acid comprises: polycarboxylic acid, polysulfonic acid, polyacrylic acid or mixtures thereof.

26. The method as set forth in claim 22, further comprising the step of separating said adsorbent from said multi metal cyanide catalyst.

27. The method as set forth in claim 22, further comprising the step of adding one of acetic acid or hydrochloric acid to said agglomeration thereby separating said multi metal cyanide catalyst from said adsorbent.

28. The method as set forth in claim 27, wherein the acetic acid or the hydrochloric acid is added in an amount such that the molar ratio of the acetic acid or the hydrochloric acid to multi metal cyanide catalyst is from about 1:1 to 10:1.

29. The method as set forth in claim 22, wherein said adsorbent is added to said polyol when said polyol has reached a desired molecular weight.

30. A method comprising the steps of:
forming a polyol in the presence of a double metal cyanide catalyst;
adding a soluble polymeric acid to said polyol;
reacting said polymeric acid with said double metal cyanide catalyst to form an agglomeration;
removing said agglomeration from said polyol; and
regenerating the double metal cyanide catalyst.

31. The method as set forth in claim 30, wherein said step of removing said agglomeration from said polyol comprises one of filtering said agglomeration from said polyol by centrifugation or by using indexing filters.

32. The method as set forth in claim 30, wherein said step of regenerating said double metal cyanide catalyst comprises washing said agglomeration with one of acetic acid or hydrochloric acid.

33. The method as set forth in claim 30, wherein said polymeric acid comprises polycarboxylic acid, polysulfonic acid, polyacrylic acid or mixtures thereof.

34. The method as set forth in claim 30, wherein said step of reacting said polymeric acid with said double metal cyanide catalyst is further defined by protonating said polyol thereby removing said double metal cyanide catalyst from said polyol.

35. The method as set forth in claim 30, wherein said polymeric acid has a molecular weight from about 500 to about 10,000.

36. The method as set forth in claim 30, wherein said polymeric acid has at least two reactive groups, each reactive group being capable of reacting with said double metal cyanide catalyst thereby forming an agglomeration.

37. The method as set forth in claim 30, further comprising the step of reacting an acid with said agglomeration thereby separating said polymeric acid from said double metal cyanide catalyst.

38. The method as set forth in claim 30, wherein said polymeric acid is added in an amount such that the molar ratio of said polymeric acid to said double metal cyanide catalyst ranges from 0.1:1 to 10:1.

39. The method as set forth in claim 30, wherein said polymeric acid is soluble in water.

40. The method as set forth in claim 30, wherein said step of adding a soluble polymeric acid to said polyol is further defined by adding said polymeric acid when said polyol has reached a desired molecular weight.

* * * * *